United States Patent
Chen et al.

(10) Patent No.: US 11,184,053 B2
(45) Date of Patent: Nov. 23, 2021

(54) COMMUNICATION DEVICE AND COMMUNICATION METHOD

(71) Applicant: Wistron NeWeb Corp., Hsinchu (TW)

(72) Inventors: Ching-Wen Chen, Hsinchu (TW); Chung-Che Lien, Hsinchu (TW); Meng-Kai Wu, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 17 days.

(21) Appl. No.: 16/738,268

(22) Filed: Jan. 9, 2020

(65) Prior Publication Data

US 2021/0105045 A1 Apr. 8, 2021

(30) Foreign Application Priority Data

Oct. 5, 2019 (TW) .................................. 108136147

(51) Int. Cl.
*H01Q 7/06* (2006.01)
*H04B 5/00* (2006.01)
*H01Q 7/00* (2006.01)

(52) U.S. Cl.
CPC ............ *H04B 5/0081* (2013.01); *H01Q 7/00* (2013.01); *H04B 5/0031* (2013.01); *H04B 5/0087* (2013.01)

(58) Field of Classification Search
CPC ............ H01Q 7/08; H01Q 7/00; H01Q 1/243; H01Q 21/24; H01Q 7/06; H01Q 1/242; H01Q 1/2208; H01Q 1/38; H01Q 3/247; H01Q 5/321
USPC .................................. 343/866, 877, 720, 788
See application file for complete search history.

(56) References Cited

U.S. PATENT DOCUMENTS

| | | | |
|---|---|---|---|
| 2006/0250319 A1* | 11/2006 | Ooi | H01Q 1/362 343/895 |
| 2011/0001673 A1* | 1/2011 | You | H01Q 5/364 343/702 |
| 2011/0068987 A1 | 3/2011 | Carr | |
| 2012/0235879 A1* | 9/2012 | Eder | H01Q 1/38 343/873 |
| 2013/0113422 A1* | 5/2013 | Lee | H04B 5/0031 320/108 |
| 2013/0267170 A1* | 10/2013 | Chong | H01Q 1/38 455/41.1 |
| 2014/0145906 A1* | 5/2014 | Kato | H01Q 1/2208 343/867 |
| 2015/0054455 A1* | 2/2015 | Kim | H01Q 7/06 320/108 |
| 2017/0040107 A1 | 2/2017 | Peralta et al. | |
| 2017/0054213 A1* | 2/2017 | Singh | H04B 5/0087 |
| 2018/0287256 A1* | 10/2018 | Shirai | H01Q 1/2225 |
| 2018/0301805 A1* | 10/2018 | Mikawa | H01Q 3/24 |
| 2020/0125917 A1* | 4/2020 | Besnier | G06K 19/07779 |

* cited by examiner

*Primary Examiner* — Linh V Nguyen
(74) *Attorney, Agent, or Firm* — McClure, Qualey & Rodack, LLP

(57) ABSTRACT

A communication device includes a dielectric substrate, a first coil antenna, a second coil antenna, and a switch circuit. The first coil antenna has a hollow region. The second coil antenna is disposed inside the hollow region of the first coil antenna. The dielectric substrate is configured to carry the first coil antenna and the second coil antenna. The switch circuit selectively enables at least one of the first coil antenna and the second coil antenna according to a power signal.

16 Claims, 8 Drawing Sheets

COMMUNICATION DEVICE AND COMMUNICATION METHOD

CROSS REFERENCE TO RELATED APPLICATIONS

This application claims priority of Taiwan Patent Application No. 108136147 filed on Oct. 5, 2019, the entirety of which is incorporated by reference herein.

BACKGROUND OF THE INVENTION

Field of the Invention

The disclosure generally relates to a communication device, and more particularly, it relates to a small-size communication device with high performance.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

NFC (Near Field Communication) is also called "short-distance wireless communication", as it is a wireless communication technology used in a short-distance range. NFC allows electronic devices to perform non-contact point-to-point data transmission to each other within a 10 cm (3.9 inches) range. Since NFC technology requires a relatively low frequency, the corresponding antenna element for NFC needs a longer resonant path. However, the inner space of a mobile device is limited, and therefore it has become a critical challenge for an antenna designer to design a small-size, high-performance NFC antenna to cover the desired frequency band.

BRIEF SUMMARY OF THE INVENTION

In an exemplary embodiment, the invention is directed to a communication device that includes a dielectric substrate, a first coil antenna, a second coil antenna, and a switch circuit. The first coil antenna has a hollow region. The second coil antenna is disposed inside the hollow region of the first coil antenna. The dielectric substrate is configured to carry the first coil antenna and the second coil antenna. The switch circuit selectively enables at least one of the first coil antenna and the second coil antenna according to a power signal.

In some embodiments, the first coil antenna covers a first operation frequency band from 13 MHz to 14 MHz.

In some embodiments, the length of the first coil antenna is substantially equal to 0.25 wavelength of the first operation frequency band.

In some embodiments, the second coil antenna covers a second operation frequency band from 13 MHz to 16 MHz.

In some embodiments, the length of the second coil antenna is substantially equal to 0.5 wavelength of the second operation frequency band.

In some embodiments, the communication device further includes a ferrite sheet disposed adjacent to the dielectric substrate, the first coil antenna, and the second coil antenna.

In some embodiments, the communication device further includes a touch pad. The dielectric substrate, the first coil antenna, and the second coil antenna are disposed between the touch pad and the ferrite sheet.

In some embodiments, the communication device further includes a system end. The system end includes a storage device, and is configured to generate the power signal. The storage device records operation information of the system end.

In some embodiments, when the power signal indicates that the system end is powered on, the switch circuit couples the first coil antenna to the system end. When the power signal indicates that the system end is powered off, the switch circuit couples the second coil antenna to the system end.

In some embodiments, the second coil antenna includes a plurality of coils coupled in series.

In another exemplary embodiment, the invention is directed to a communication method that includes the steps of: providing a dielectric substrate, a first coil antenna, and a second coil antenna, wherein the first coil antenna has a hollow region, the second coil antenna is disposed inside the hollow region of the first coil antenna, and the dielectric substrate is configured to carry the first coil antenna and the second coil antenna; and selectively enabling at least one of the first coil antenna and the second coil antenna by a switch circuit according to a power signal.

In some embodiments, the communication method further includes: generating the power signal by a system end, wherein the system end includes a storage device.

In some embodiments, the communication method further includes: when the power signal indicates that the system end is powered on, coupling the first coil antenna to the system end by the switch circuit.

In some embodiments, the communication method further includes: when the power signal indicates that the system end is powered on, recording operation information of the system end by the storage device.

In some embodiments, the communication method further includes: when the power signal indicates that the system end is powered off, coupling the second coil antenna to the system end by the switch circuit.

In some embodiments, the communication method further includes: when the power signal indicates that the system end is powered off, reading the operation information in the storage device by an external device.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
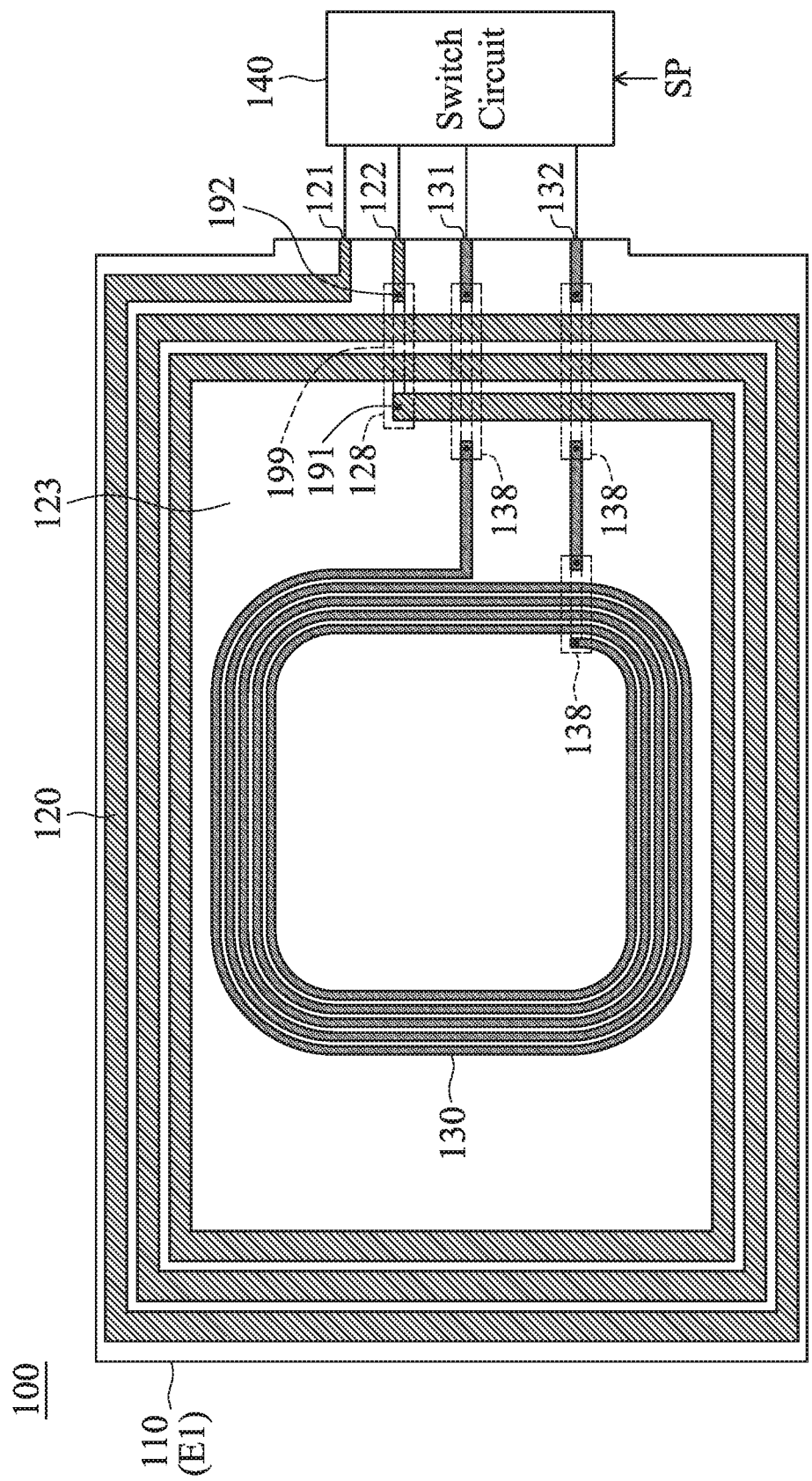
FIG. 1 is a top view of a communication device according to an embodiment of the invention.

FIG. 1 is a top view of a communication device 100 according to an embodiment of the invention. The communication device 100 may be a smart phone, a tablet computer, or a notebook computer. In the embodiment of FIG. 1, the communication device 100 at least includes a dielectric substrate 110, a first coil antenna 120, a second coil antenna 130, and a switch circuit 140. It should be noted that the communication device 100 further includes other components, such as a display device, a speaker, a touch control module, a power supply module, and/or a housing, although they are not displayed in FIG. 1.

The dielectric substrate 110 is configured to carry the first coil antenna 120 and the second coil antenna 130. For example, the dielectric substrate 110 may be an FR4 (Flame Retardant 4) substrate, a PCB (Printed Circuit Board), or an FCB (Flexible Circuit Board). Specifically, the dielectric substrate 110 has a first surface E1 and a second surface E2 which are opposite to each other. The first coil antenna 120 and the second coil antenna 130 are substantially disposed on the first surface E1 of the dielectric substrate 110. However, the invention is not limited thereto. In some embodiments, the first coil antenna 120 and the second coil antenna 130 are substantially disposed on the second surface E2 of the dielectric substrate 110. In alternative embodiments, the first coil antenna 120 and the second coil antenna 130 are distributed over the first surface E1 and the second surface E2 of the dielectric substrate 110.

The first coil antenna 120 and the second coil antenna 130 may be made of metal materials. For example, the first coil antenna 120 may substantially have a relatively-large hollow rectangular shape, and the second coil antenna 130 may substantially have a relatively-small hollow square shape. The first coil antenna 120 has a hollow region 123, which may substantially have a relatively-large rectangular shape. The second coil antenna 130 or its vertical projection is disposed inside the hollow region 123 of the first coil antenna 120. It should be understood that the shapes of the first coil antenna 120 and the second coil antenna 130 are adjustable according to different requirements. In alternative embodiments, any of the first coil antenna 120 and the second coil antenna 130 substantially has a hollow circular shape, a hollow elliptical shape, a hollow regular triangular shape, or a hollow regular hexagonal shape. Specifically, the first coil antenna 120 has a first terminal 121 and a second terminal 122. Both the first terminal 121 and the second terminal 122 of the first coil antenna 120 are coupled to the switch circuit 140. The second coil antenna 130 has a first terminal 131 and a second terminal 132. Both the first terminal 131 and the second terminal 132 of the second coil antenna 130 are coupled to the switch circuit 140.

In some embodiments, the first coil antenna 120 includes one or more first bridge structures 128. Specifically, each first bridge structure 128 may include a first conductive via element 191, a second conductive via element 192, and a metal connection line 199. Main traces of the first coil antenna 120 may be substantially distributed over the first surface E1 of the dielectric substrate 110. When a design of jumping connections is requested, the first conductive via element 191 and the second conductive via element 192 may penetrate the dielectric substrate 110, and the metal connection line 199 may be disposed on the second surface E2 of the dielectric substrate 110 and coupled between the first conductive via element 191 and the second conductive via element 192, such that the first bridge structure 128 can form a jumper wire between two different connection points on the main traces. In alternative embodiments, the second coil antenna 130 includes one or more second bridge structures 138, whose operation principles are similar to those of the first bridge structure 128 of the first coil antenna 120, and they are not illustrated again herein. The first bridge structure 128 and the second bridge structure 138 are optional elements, and they can increase the design flexibility of the first coil antenna 120 and the second coil antenna 130.

The switch circuit 140 selectively enables at least one of the first coil antenna 120 and the second coil antenna 130 according to a power signal SP. For example, the switch circuit 140 may be an SPDT (Single Pole Double Throw) switch, but it is not limited thereto. If the power signal SP has a high logic level (or a logic "1"), the switch circuit 140 can couple with the first coil antenna 120, so as to enable the first coil antenna 120. Conversely, if the power signal SP has a low logic level (or a logic "0"), the switch circuit 140 can couple with the second coil antenna 130, so as to enable the second coil antenna 130. In some embodiments, the switch circuit 140 is implemented with a plurality of MOSFETs (Metal Oxide Semiconductor Field Effect Transistors). In alternative embodiments, the second coil antenna 130 is always enabled, and the first coil antenna 120 is selectively enabled or disabled by the switch circuit 140 according to the power signal SP.

According to practical measurements, the first coil antenna 120 can cover a first operation frequency band from 13 MHz to 14 MHz, and the second coil antenna 130 can cover a second operation frequency band from 13 MHz to 16 MHz. Therefore, both the first coil antenna 120 and the second coil antenna 130 can support the wideband operations of NFC (Near Field Communication). By using the switch circuit 140, the communication device 100 can select one of the first coil antenna 120 and the second coil antenna 130, so as to correspond to different operation modes. It should be noted that since the second coil antenna 130 is completely surrounded by the first coil antenna 120, the total size of the communication device 100 is significantly reduced, and the total manufacturing cost of the communication device 100 is decreased.

In some embodiments, the element sizes and element parameters of the communication device 100 are described as follows. The length of the first coil antenna 120 (i.e., the length from the first end 121 to the second end 122) may be substantially equal to 0.25 wavelength (λ/4) of the first operation frequency band. The number of turns of the first coil antenna 120 may be from 2 to 10, such as 3. The length of the second coil antenna 130 (i.e., the length from the first end 131 to the second end 132) may be substantially equal to 0.5 wavelength (λ/2) of the second operation frequency band. The number of turns of the second coil antenna 130 may be from 4 to 20, such as 6. The above ranges of element sizes and element parameters are calculated and obtained according to many experimental results, and they help to optimize the operation bandwidth and impedance matching of the first coil antenna 120 and the second coil antenna 130.

In alternative embodiments, the first coil antenna 120 is further coupled to a first matching circuit (not shown), and the second coil antenna 130 is further coupled to a second matching circuit (not shown). Each of the first matching circuit and the second matching circuit includes one or more capacitors and/or one or more inductors, so as to fine-tune the operation frequencies of the first coil antenna 120 and the second coil antenna 130.

Figure 2:
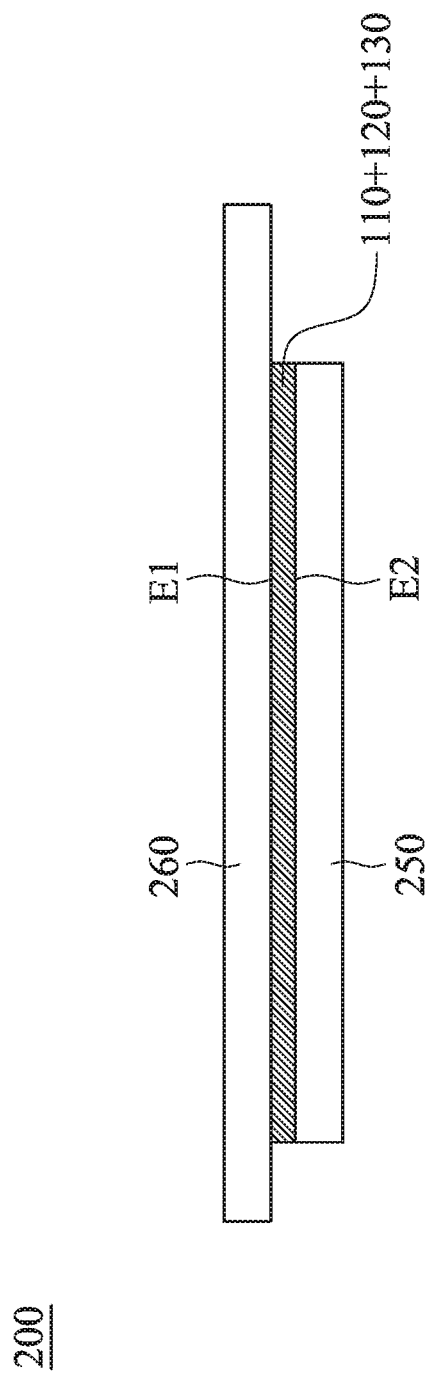
FIG. 2 is a side view of a communication device according to an embodiment of the invention.

FIG. 2 is a side view of a communication device 200 according to an embodiment of the invention. In the embodiments of FIG. 2, the communication device 200 further includes a ferrite sheet 250 and a touch pad 260. If the communication device 200 is a notebook computer, the touch pad 260 may be embedded in a keyboard frame (i.e., the so-called "C-component" in the field of notebook computers), so as to receive finger touch signals of users. The dielectric substrate 110, the first coil antenna 120, and the second coil antenna 130 are all disposed between the touch pad 260 and the ferrite sheet 250. The ferrite sheet 250 is disposed adjacent to the dielectric substrate 110, the first coil antenna 120, and the second coil antenna 130. It should be noted that the term "adjacent" or "close" over the disclosure means that the distance (spacing) between two corresponding elements is smaller than a predetermined distance (e.g., 5 mm or the shorter), or means that the two corresponding elements directly touch each other (i.e., the aforementioned distance/spacing therebetween is reduced to 0). According to practical measurements, the incorporation of the ferrite sheet 250 can reduce eddy currents caused by the touch pad 260, thereby increasing the communication distances of the first coil antenna 120 and the second coil antenna 130. Other features of the communication device 200 of FIG. 2 are similar to those of the communication device 100 of FIG. 1. Therefore, the two embodiments can achieve similar levels of performance.

Figure 3:
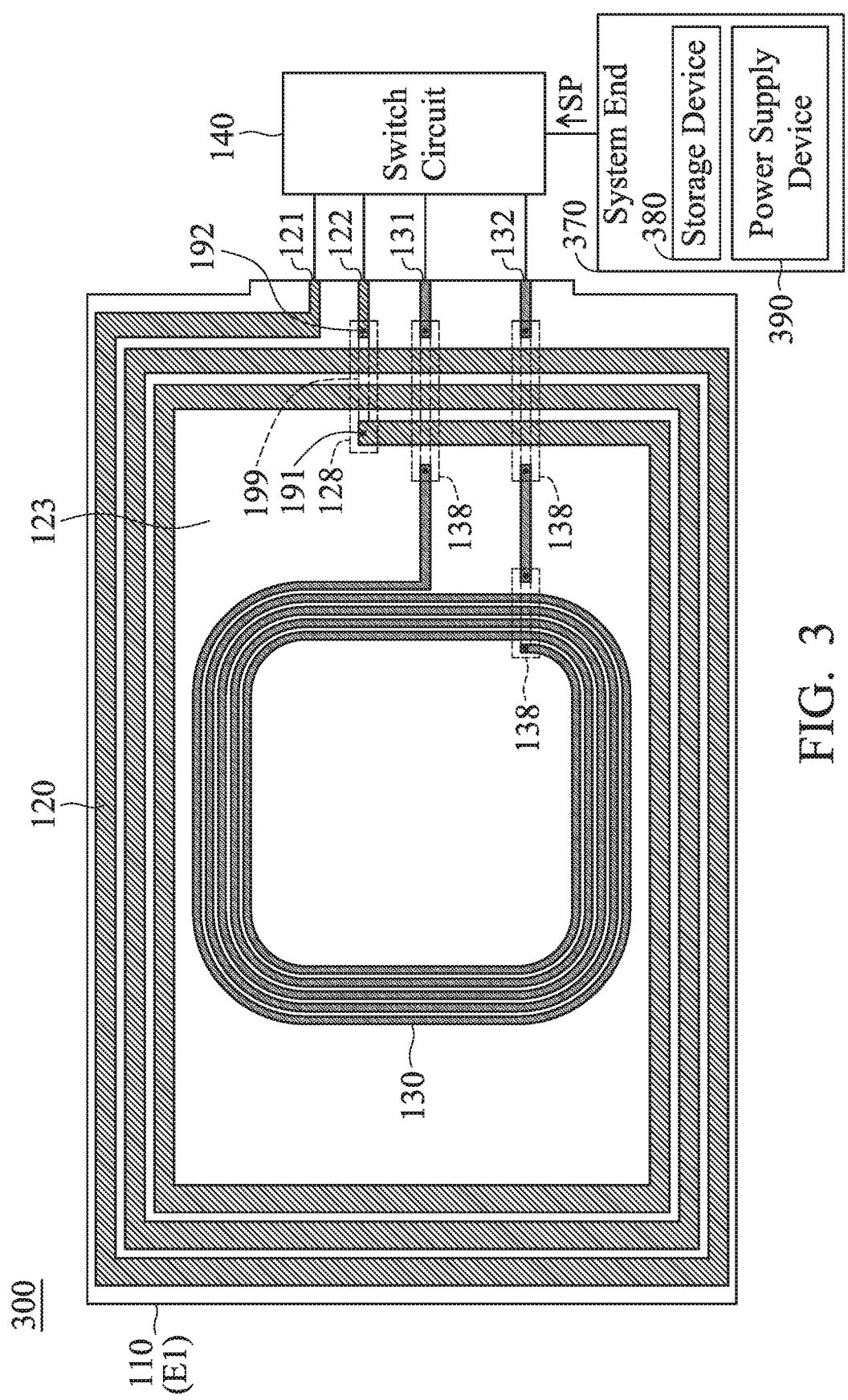
FIG. 3 is a top view of a communication device according to an embodiment of the invention.

FIG. 3 is a top view of a communication device 300 according to an embodiment of the invention. FIG. 3 is similar to FIG. 1. In the embodiment of FIG. 3, the communication device 300 further includes a system end 370, which selectively operates in an active reader mode or a passive tag mode. Specifically, the system end 370 includes a storage device 380 and a power supply device 390. The storage device 380 can record operation information of the system end 370. The power supply device 390 can generate the power signal SP. For example, the storage device 380 may be a storage chip of an RFID (Radio Frequency Identification) tag. When the power signal SP indicates that the system end 370 is powered on (e.g., the power signal SP may have a high logic level), the system end 370 operates in the active reader mode, and the switch circuit 140 couples both the first terminal 121 and the second terminal 122 of the first coil antenna 120 to the system end 370, thereby enabling the first coil antenna 120. In the active reader mode, the system end 370 can use the first coil antenna 120 to access data of other devices, and the system end 370 can continuously write its operation information into the storage device 380. When the power signal SP indicates that the system end 370 is powered off (e.g., the power signal SP may have a low logic level), the system end 370 operates in the passive tag mode, and the switch circuit 140 couples both the first terminal 131 and the second terminal 132 of the second coil antenna 130 to the system end 370, thereby enabling the second coil antenna 130. In the passive tag mode, an external device (not shown) can use the second coil antenna 130 to read the operation information stored in the storage device 380, and it helps to perform a debug process relative to the communication device 300 later. For example, if the communication device 300 has malfunction and cannot be powered on, the external device can estimate possible reasons by analyzing the operation information stored in the storage device 380. Other features of the communication device 300 of FIG. 3 are similar to those of the communication device 100 of FIG. 1. Therefore, the two embodiments can achieve similar levels of performance.

The following embodiments will introduce a variety of configurations of the second coil antenna 130, which may include a plurality of coils coupled in series. It should be understood that these figures and descriptions are merely exemplary, rather than limitations of the invention.

Figure 4:
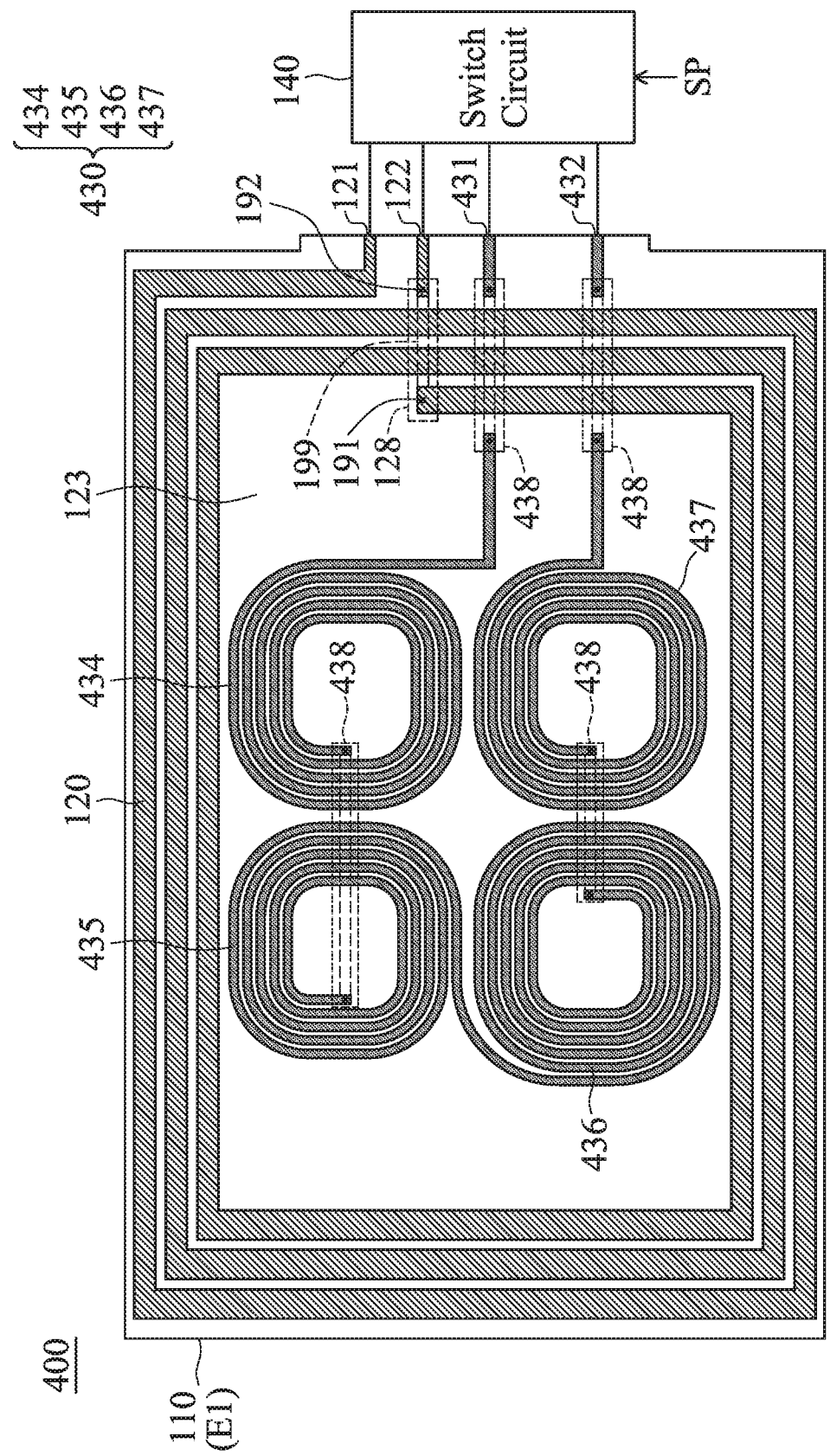
FIG. 4 is a top view of a communication device according to an embodiment of the invention.

FIG. 4 is a top view of a communication device 400 according to an embodiment of the invention. FIG. 4 is similar to FIG. 1. In the embodiment of FIG. 4, a second coil antenna 430 of the communication device 400 includes a first coil 434, a second coil 435, a third coil 436, and a fourth coil 437, which are coupled in series between a first terminal 431 and a second terminal 432 of the second coil antenna 430. Each of the first coil 434, the second coil 435, the third coil 436, and the fourth coil 437 may substantially have a hollow square shape. When a design of jumping connections is requested, the second coil antenna 430 may include one or more second bridge structures 438. According to practical measurements, such a design of increasing the total number of coils can increase the communication distance of the second coil antenna 430 in the passive tag mode. Other features of the communication device 400 of FIG. 4 are similar to those of the communication device 100 of FIG. 1. Therefore, the two embodiments can achieve similar levels of performance.

Figure 5:
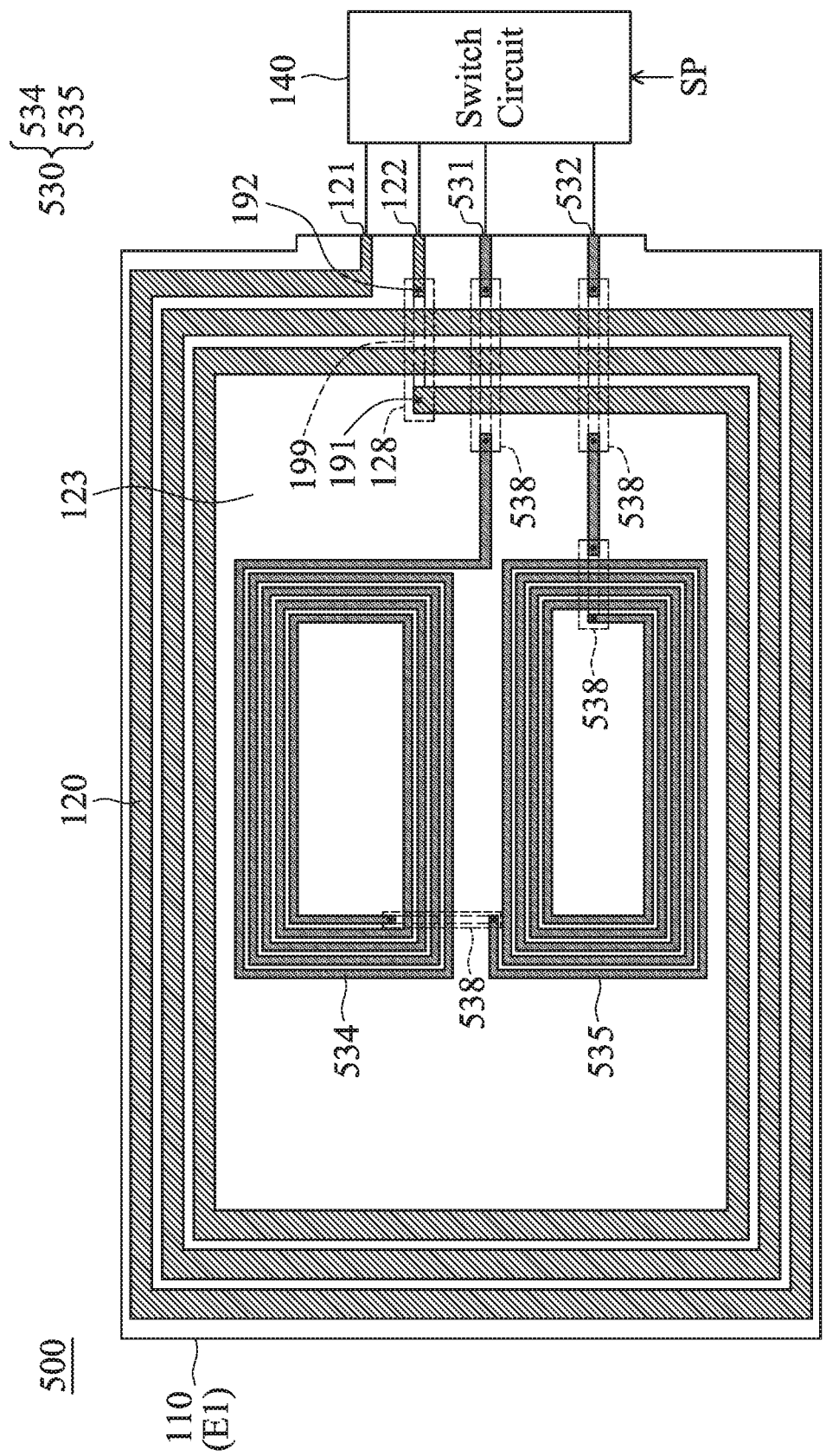
FIG. 5 is a top view of a communication device according to an embodiment of the invention.

FIG. 5 is a top view of a communication device 500 according to an embodiment of the invention. FIG. 5 is similar to FIG. 1. In the embodiment of FIG. 5, a second coil antenna 530 of the communication device 500 includes a first coil 534 and a second coil 535, which are coupled in series between a first terminal 531 and a second terminal 532 of the second coil antenna 530. Each of the first coil 534 and the second coil 535 may substantially have a hollow rectangular shape. When a design of jumping connections is requested, the second coil antenna 530 may include one or more second bridge structures 538. According to practical measurements, such a design of increasing the total number of coils can increase the communication distance of the second coil antenna 530 in the passive tag mode. Other features of the communication device 500 of FIG. 5 are similar to those of the communication device 100 of FIG. 1. Therefore, the two embodiments can achieve similar levels of performance.

Figure 6:
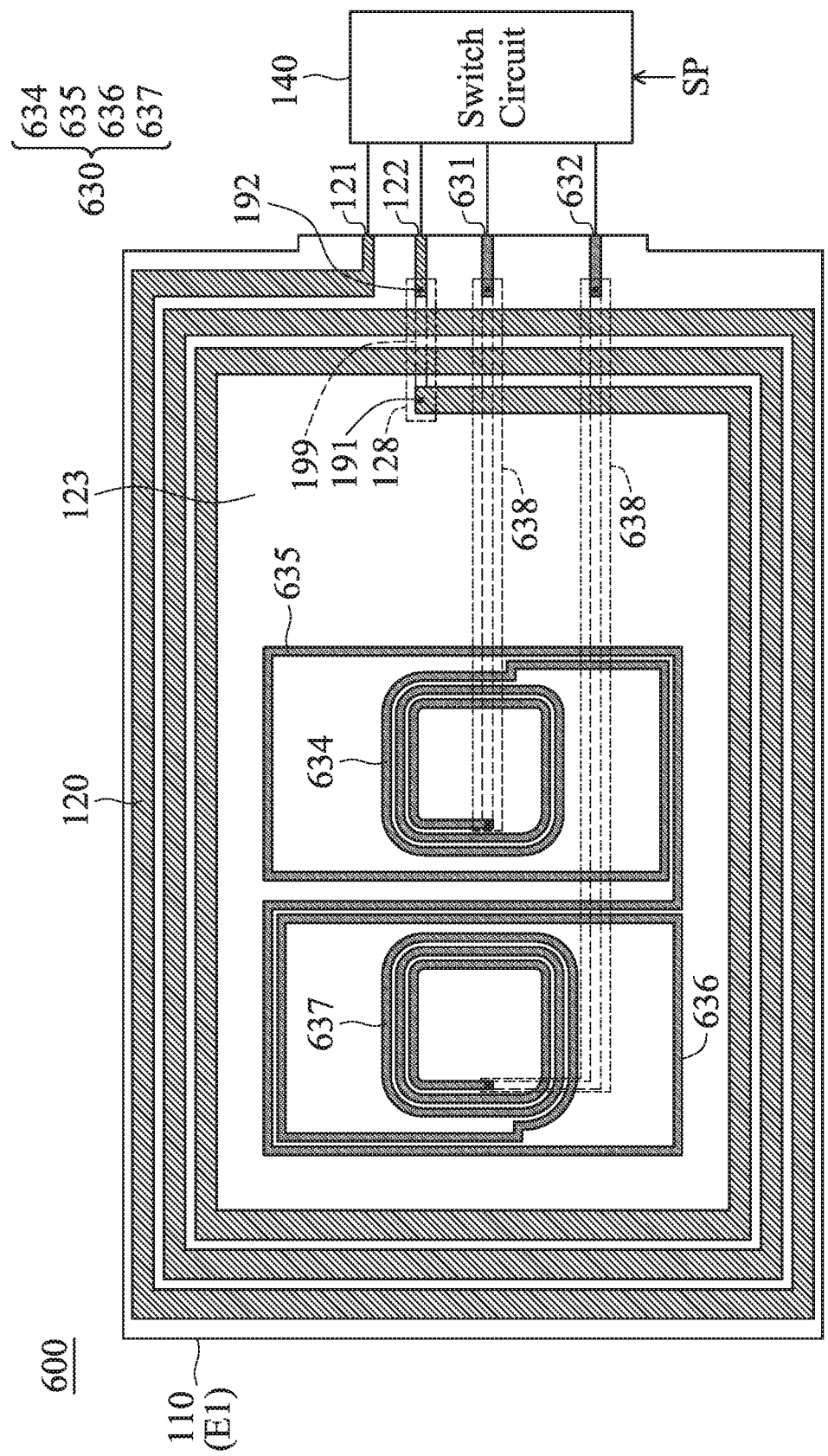
FIG. 6 is a top view of a communication device according to an embodiment of the invention.

FIG. 6 is a top view of a communication device 600 according to an embodiment of the invention. FIG. 6 is similar to FIG. 1. In the embodiment of FIG. 6, a second coil antenna 630 of the communication device 600 includes a first coil 634, a second coil 635, a third coil 636, and a fourth coil 637, which are coupled in series between a first terminal 631 and a second terminal 632 of the second coil antenna 630. Each of the first coil 634 and the fourth coil 637 may substantially have a hollow square shape. Each of the second coil 635 and the third coil 636 may substantially have a hollow rectangular shape. The first coil 634 is surrounded by the second coil 635. The fourth coil 637 is surrounded by the third coil 636. When a design of jumping connections is requested, the second coil antenna 630 may include one or more second bridge structures 638. According to practical measurements, such a design of increasing the total number of coils can increase the communication distance of the second coil antenna 630 in the passive tag mode. Other features of the communication device 600 of FIG. 6 are similar to those of the communication device 100 of FIG. 1. Therefore, the two embodiments can achieve similar levels of performance.

Figure 7:
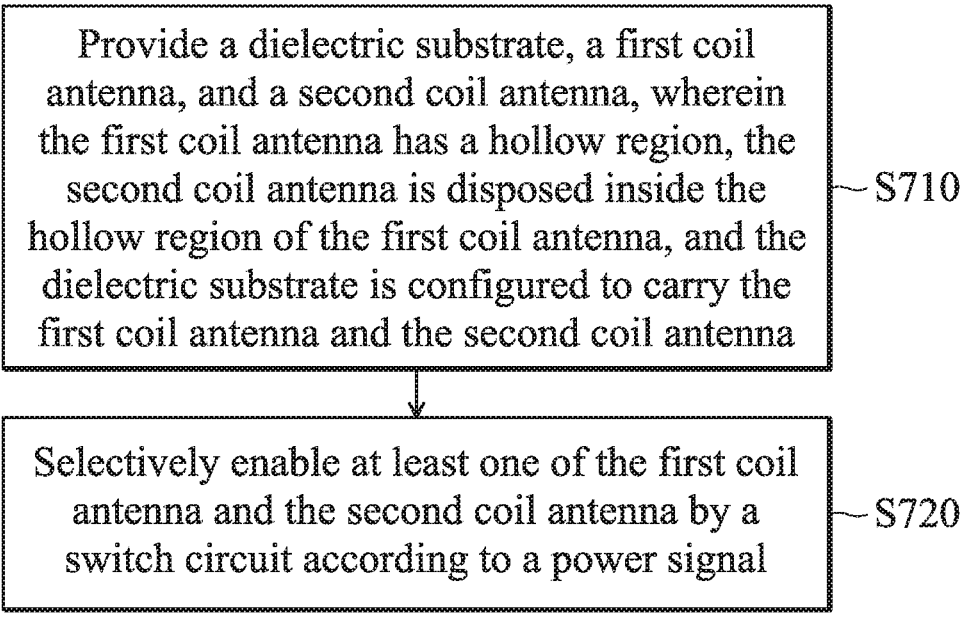
FIG. 7 is a flowchart of a communication method according to an embodiment of the invention.

FIG. 7 is a flowchart of a communication method according to an embodiment of the invention. In step S710, a dielectric substrate, a first coil antenna, and a second coil antenna are provided. The first coil antenna has a hollow region. The second coil antenna is disposed inside the hollow region of the first coil antenna. The dielectric substrate is configured to carry the first coil antenna and the second coil antenna. In step S720, at least one of the first coil antenna and the second coil antenna is selectively enabled by a switch circuit according to a power signal. It should be noted that the above steps are not required to be performed in order, and all of the features of the communication devices of FIGS. 1 to 6 may be applied to the communication method of FIG. 7.

Figure 8:
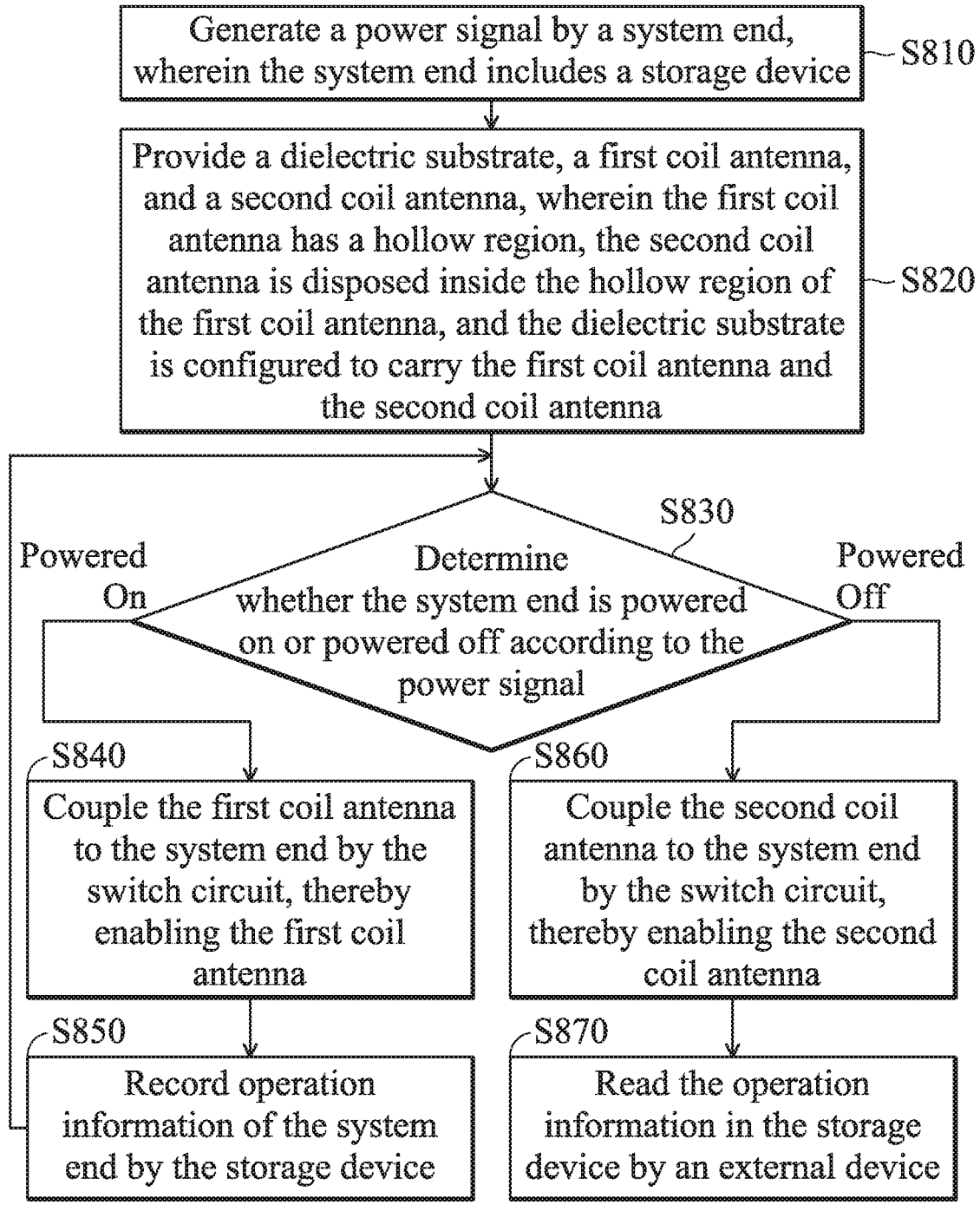
FIG. 8 is a flowchart of a communication method according to an embodiment of the invention.

FIG. 8 is a flowchart of a communication method according to an embodiment of the invention. In step S810, a power signal is generated by a system end. The system end includes a storage device. In step S820, a dielectric substrate, a first coil antenna, and a second coil antenna are provided. The first coil antenna has a hollow region. The second coil antenna is disposed inside the hollow region of the first coil antenna. The dielectric substrate is configured to carry the first coil antenna and the second coil antenna. In step S830, whether the system end is powered on or powered off is determined according to the power signal. When the power signal indicates that the system end is powered on (i.e., the active reader mode), in step S840, the first coil antenna is coupled to the system end by the switch circuit, and thus the first coil antenna is enabled. Specifically, the system end can use the first coil antenna to access data of other devices. Next, in step S850, operation information of the system end is recorded by the storage device. Conversely, when the power signal indicates that the system end is powered off (i.e., the passive tag mode), in step S860, the second coil antenna is coupled to the system end by the switch circuit, and thus the second coil antenna is enabled. Next, in step S870, the operation information stored in the storage device is read by an external device. Specifically, the external device may be independent of the communication device, and the external device can use the second coil antenna to read the operation information stored in the storage device. This helps to perform a debug process relative to the communication device later. It should be noted that the above steps are not required to be performed in order, and all of the features of the communication devices of FIGS. 1 to 6 may be applied to the communication method of FIG. 8. In alternative embodiments, the steps S840 and S850 are performed before the steps S860 and S870 are performed. That is, the communication device may enter the active reader mode in the beginning, and switch from the active reader mode to the passive tag mode later.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

The invention proposes a novel communication device which includes two switchable coil antennas corresponding to different operation modes. Generally, the invention has at least the advantages of reducing the whole device size, increasing the antenna communication distance, and decreasing the whole manufacturing cost, and therefore it is suitable for application in a variety of mobile communication devices.

Note that the above element sizes, element shapes, and frequency ranges are not limitations of the invention. A designer can fine-tune these settings or values to meet different requirements. It should be understood that the communication device and communication method of the invention are not limited to the configurations of FIGS. 1-8. The invention may merely include any one or more features of any one or more embodiments of FIGS. 1-8. In other words, not all of the features displayed in the figures should be implemented in the communication device and communication method of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device, comprising:
a dielectric substrate;
a first coil antenna, having a hollow region;

a second coil antenna, disposed inside the hollow region of the first coil antenna, wherein the dielectric substrate is configured to carry the first coil antenna and the second coil antenna;

a switch circuit, selectively enabling at least one of the first coil antenna and the second coil antenna according to a power signal; and a system end, comprising a storage device, and configured to generate the power signal, wherein the storage device records operation information of the system end;

wherein when the power signal indicates that the system end is powered on, the switch circuit couples the first coil antenna to the system end, and when the power signal indicates that the system end is powered off, the switch circuit couples the second coil antenna to the system end.

2. The communication device as claimed in claim 1, wherein the first coil antenna covers a first operation frequency band from 13 MHz to 14 MHz.

3. The communication device as claimed in claim 2, wherein a length of the first coil antenna is substantially equal to 0.25 wavelength of the first operation frequency band.

4. The communication device as claimed in claim 1, wherein the second coil antenna covers a second operation frequency band from 13 MHz to 16 MHz.

5. The communication device as claimed in claim 4, wherein a length of the second coil antenna is substantially equal to 0.5 wavelength of the second operation frequency band.

6. The communication device as claimed in claim 1, further comprising:
a ferrite sheet, disposed adjacent to the dielectric substrate, the first coil antenna, and the second coil antenna.

7. The communication device as claimed in claim 6, further comprising:
a touch pad, wherein the dielectric substrate, the first coil antenna, and the second coil antenna are disposed between the touch pad and the ferrite sheet.

8. The communication device as claimed in claim 1, wherein the second coil antenna comprises a plurality of coils coupled in series.

9. A communication method, comprising the steps of:
providing a dielectric substrate, a first coil antenna, and a second coil antenna, wherein the first coil antenna has a hollow region, the second coil antenna is disposed inside the hollow region of the first coil antenna, and the dielectric substrate is configured to carry the first coil antenna and the second coil antenna;
selectively enabling at least one of the first coil antenna and the second coil antenna by a switch circuit according to a power signal;
generating the power signal by a system end, wherein the system end comprises a storage device;
when the power signal indicates that the system end is powered on, coupling the first coil antenna to the system end by the switch circuit; and
when the power signal indicates that the system end is powered off, coupling the second coil antenna to the system end by the switch circuit.

10. The communication method as claimed in claim 9, wherein the first coil antenna covers a first operation frequency band from 13 MHz to 14 MHz.

11. The communication method as claimed in claim 10, wherein a length of the first coil antenna is substantially equal to 0.25 wavelength of the first operation frequency band.

12. The communication method as claimed in claim 9, wherein the second coil antenna covers a second operation frequency band from 13 MHz to 16 MHz.

13. The communication method as claimed in claim 12, wherein a length of the second coil antenna is substantially equal to 0.5 wavelength of the second operation frequency band.

14. The communication method as claimed in claim 9, further comprising:
when the power signal indicates that the system end is powered on, recording operation information of the system end by the storage device.

15. The communication method as claimed in claim 9, further comprising:
wherein when the power signal indicates that the system end is powered off, reading the operation information in the storage device by an external device.

16. A communication device, comprising:
a dielectric substrate;
a first coil antenna, having a hollow region;
a second coil antenna, disposed inside the hollow region of the first coil antenna, wherein the dielectric substrate is configured to carry the first coil antenna and the second coil antenna;
a switch circuit, selectively enabling at least one of the first coil antenna and the second coil antenna according to a power signal; and
a system end, comprising a storage device, and configured to generate the power signal, wherein the storage device records operation information of the system end;
wherein when the power signal indicates that the system end is powered on, the switch circuit couples the first coil antenna to the system end, and when the power signal indicates that the system end is powered off, the switch circuit couples the second coil antenna to the system end so that an external device can use the second coil antenna to read the operation information in the storage device.

* * * * *